United States Patent
Peisa et al.

(10) Patent No.: US 7,382,732 B2
(45) Date of Patent: Jun. 3, 2008

(54) METHOD AND SYSTEM FOR FLOW CONTROL FOR ROUTE SWITCHING

(75) Inventors: Janne Johannes Peisa, Espoo (FI); Toomas Wigell, Espoo (FI); Reijo Matinmikko, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 811 days.

(21) Appl. No.: 10/485,919

(22) PCT Filed: Aug. 16, 2002

(86) PCT No.: PCT/SE02/01471

§ 371 (c)(1),
(2), (4) Date: Feb. 5, 2004

(87) PCT Pub. No.: WO03/017711

PCT Pub. Date: Feb. 27, 2003

(65) Prior Publication Data

US 2004/0246898 A1    Dec. 9, 2004

(30) Foreign Application Priority Data

Aug. 17, 2001    (SE) .................................... 0102775

(51) Int. Cl.
    *H04L 12/28*    (2006.01)

(52) U.S. Cl. ...................................... 370/236; 370/252
(58) Field of Classification Search ........ 370/235–236, 370/236.1, 236.2, 237, 238, 238.1, 252–253
See application file for complete search history.

(56) References Cited

U.S. PATENT DOCUMENTS

| | | | | |
|---|---|---|---|---|
| 5,276,677 A * | 1/1994 | Ramamurthy et al. | ...... | 370/232 |
| 5,805,577 A * | 9/1998 | Jain et al. | ..................... | 370/234 |
| 5,896,373 A * | 4/1999 | Mitts et al. | ................... | 370/331 |
| 5,909,443 A * | 6/1999 | Fichou et al. | ............... | 370/412 |
| 5,940,371 A * | 8/1999 | Mitts et al. | .................. | 370/236 |
| 6,104,757 A * | 8/2000 | Rhee | ..................... | 375/240.12 |
| 6,192,029 B1 * | 2/2001 | Averbuch et al. | ........... | 370/229 |
| 6,594,238 B1 * | 7/2003 | Wallentin et al. | ........... | 370/252 |
| 6,738,368 B1 * | 5/2004 | Terry | .......................... | 370/342 |
| 2001/0055313 A1 * | 12/2001 | Yin et al. | .................... | 370/466 |

FOREIGN PATENT DOCUMENTS

EP    0798943 A2    10/1997

\* cited by examiner

*Primary Examiner*—Kwang Bin Yao
*Assistant Examiner*—Andrew Lai
(74) *Attorney, Agent, or Firm*—Roger S. Burleigh

(57) ABSTRACT

The present invention provides flow control for route switching in a communications system using retransmissions. It is well suited for a cellular mobile radio communications system, particularly a Universal Mobile Telecommunications System, UMTS.

26 Claims, 8 Drawing Sheets

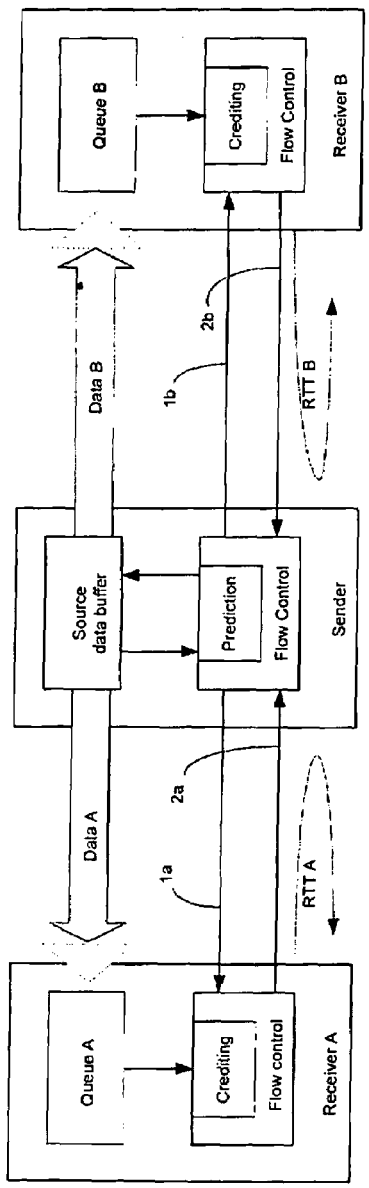
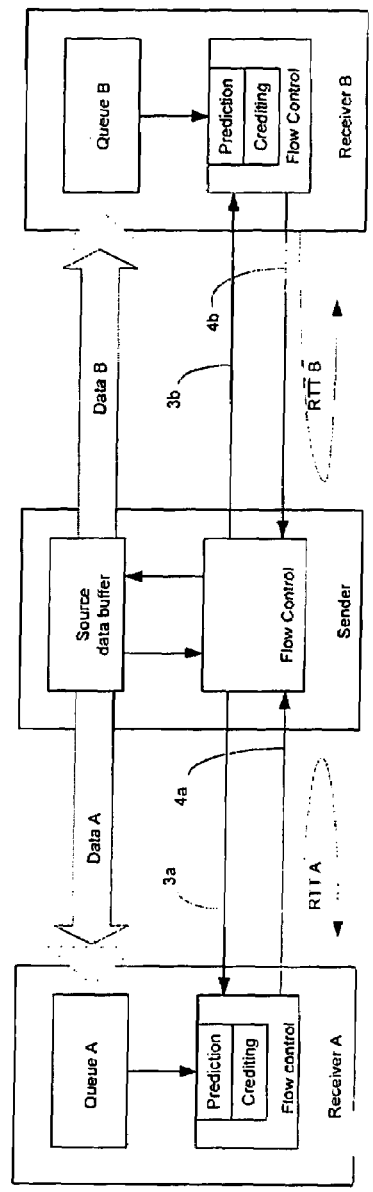
FIG. 11
FIG. 12

METHOD AND SYSTEM FOR FLOW CONTROL FOR ROUTE SWITCHING

TECHNICAL FIELD OF THE INVENTION

The present invention relates to retransmissions in a communications system, and more especially it relates to a cellular mobile radio system, particularly to a Universal Mobile Telecommunications System, UMTS or WCDMA system.

BACKGROUND AND DESCRIPTION OF RELATED ART

Retransmission of data to or from a mobile station, MS, or user equipment, UE, is previously known. It is also known to use medium access control and radio link control layers of a UMTS protocol structure in acknowledged mode for dedicated, common and shared channels.

In acknowledged mode, retransmissions are undertaken in case of detected transmission errors not recovered by forward error control. This is also called automatic repeat request, ARQ. With ARQ, retransmissions can be undertaken unless a transmitted message is (positively) acknowledged or if it is negatively acknowledged. Generally there are time limits for the respective positive and negative acknowledgements to be considered.

Within this patent application, a radio network controller, RNC, is understood as a network element including a radio resource controller. Node B is a logical node responsible for radio transmission/reception in one or more cells to/from a User Equipment. A base station, BS, is a physical entity representing Node B.

With reference to FIG. 1, base stations >>BS 1<< and >>BS 2<< are physical entities representing Nodes B >>Node B 1<< and >>Node B 2<< respectively. Node B 1 and Node B 2 terminate the air interface, called Uu interface within UMTS, between UE and respective Node B towards the radio network controller RNC. In UMTS the interface between a Node B and an RNC is called Iub interface.

Medium access control, MAC, and radio link control, RLC, is used within radio communications systems like General Packet Radio Services, GPRS, and UMTS.

International Patent Application WO0021244 describes flow control operating in WT space, based upon measurements of number of packets (window, W) and round-trip time (time, T) for avoiding system underload/overload by adjusting packet sending rate. A terminal measures window size, round-trip time and packet losses for determining of its sending rate. Alternatively, the terminal is provided with explicit indicators of congestion status or sending rate from network nodes.

Canadian Patent Application CA02308937 discloses a method and apparatus for interconnection of flow-controlled communications. Flow control is performed by including status information in upstream direction of a bi-directional communication link revealing availability status of the channel in downstream direction. A scheduler selects channels for downstream data depending on their availability status.

International Patent Application WO0041365 demonstrates a method and system for credit-based data flow control where a receiver establishes a credit list and transfers a credit message to the sender. When the sender transfers data packets to the receiver, the credit outstanding is reduced. The sender transfers packets only as long as its credit is not consumed. With no credit available, the sender refrains from transmitting packets to the receiver until it achieves new credits.

U.S. Pat. No. 5,831,985 describes a method and system for flow control of communications over a fiber channel. A switch allocates connection line capacity to data sources in relation to their priority and credit available to the source.

$3^{rd}$ Generation Partnership Project (3GPP): Technical Specification Group Radio Access Network, UTRAN Overall Description, 3G TS 25.401 v3.6.0, France, March 2001, specifies in section 11.1 a general protocol model for UTRAN interfaces. In subsection 11.2.5 a model of a DSCH (Downlink Shared Channel) transport channel for co-incident and separate controlling and serving RNCs respectively. A DSCH is a downlink channel shared dynamically between UEs. It carries dedicated control or traffic data.

$3^{rd}$ Generation Partnership Project (3GPP): Technical Specification Group Radio Access Network, Radio Interface Protocol Architecture, 3G TS 25.301 v3.6.0, France, September 2000, describes in paragraph 5.6.5.3 a model of a DSCH, an RACH/FACH and a DCH in UTRAN.

FIG. 2 displays a simplified UMTS layers 1 and 2 protocol structure for a Uu Stratum, UuS, or Radio Stratum, between a user equipment UE and a Universal Terrestrial Radio Access Network, UTRAN. The radio interface includes three protocol layers:
physical layer L1,
data link layer L2 and
network layer L3.

Two of the protocol layers (L1 and L2) are included in FIG. 2. The data link layer is split into four sub-layers: PDCP (Packet Data Convergence Protocol), BMC (Broadcast/Multicast Control), RLC (Radio Link Control) and MAC (Medium Access Control).

Radio Access Bearers, RABs, are associated with the application for transportation of services between core network, CN, and user equipment, UE, through a radio access network. Each RAB is associated with quality attributes such as service class, guaranteed bit rate, transfer delay, residual BER (Bit Error Rate), and traffic handling priority. An RAB may be assigned one or more Radio Bearers, RBs, being responsible for the transportation between UTRAN and UE. For each mobile station there may be one or several RBs representing a radio link comprising one or more channels between UE and UTRAN. Data flows (in the form of segments) of the RBs are passed to respective Radio Link Control, RLC, entities which amongst other tasks buffer the received data segments. There is one RLC entity for each RB. In the RLC layer, RBs are mapped onto respective logical channels. A Medium Access Control, MAC, entity receives data transmitted in the logical channels and further maps logical channels onto a set of transport channels. In accordance with subsection 5.3.1.2 of the 3GPP technical specification, MAC should support service multiplexing e.g. for RLC services to be mapped on the same transport channel. In this case identification of multiplexing is contained in the MAC protocol control information.

Transport channels are finally mapped to a single physical channel which has a total bandwidth allocated to it by the network. In frequency division duplex mode, a physical channel is defined by code, frequency and, in the uplink, relative phase (I/Q). In time division duplex mode a physical channel is defined by code, frequency, and time-slot. The DSCH, e.g., is mapped onto one or several physical channels such that a specified part of the downlink resources is employed. As further described in subsection 5.2.2 of the 3GPP technical specification the L1 layer is responsible for error detection on transport channels and indication to higher layer, FEC (Forward Error Correction) encoding/decoding and interleaving/deinterleaving of transport channels.

Packet Data Convergence Protocol, PDCP, provides mapping between Network PDUs (Protocol Data Units) of a network protocol, e.g. the Internet protocol, to an RLC entity. PDCP compresses and decompresses redundant Network PDU control information (header compression and decompression).

For transmissions on point-to-multipoint logical channels, Broadcast/Multicast Control, BMC, stores at UTRAN-side Broadcast Messages received from an RNC, calculates the required transmission rate and requests for the appropriate channel resources. It receives scheduling information from the RNC, and generates schedule messages. For transmission, the messages are mapped on a point-to-multipoint logical channel. At the UE side, BMC evaluates the schedule messages and deliver Broadcast Messages to upper layer in the UE.

3G TS 25.301 also describes protocol termination, i.e. in which node of the UTRAN the radio interface protocols are terminated, or equivalently, where within UTRAN the respective protocol services are accessible.

FIG. 3 illustrates a DSCH and FACH protocol model in accordance with 3GPP TS 25.301. The figure illustrates schematically two respective RNC entities of a Serving RNC and a Controlling RNC. As already mentioned, the Serving RNC and Controlling RNC can be separate or co-incident. In case of separate RNCs they communicate over an Iur interface, otherwise they communicate locally. An RNC comprises an RLC entity including an L2/RLC protocol layer >>L2/RLC<< at UTRAN side in FIG. 2. In FIG. 3, RLC entities >>RLC S<< and >>RLC C<< are entities of the Serving RNC and Controlling RNC respectively. In the figure there are two MAC-entities >>MAC-d<<, >>MAC-c/-sh<< illustrated routing dedicated channels over common or shared channels. MAC-d resides in the Serving RNC and MAC-c/-sh in the Controlling RNC. The routing comprises buffering of data in the MAC-entities >>MAC-d<< and >>MAC-c/-sh<<, to accommodate for the unsynchronized data flows into and out of MAC-d and MAC-c/-sh. The two MAC-entities are responsible for the L2/MAC protocol layer functionality at UTRAN side according to FIG. 2. The simplified protocol model in FIG. 3 is illustrated for a DSCH (Downlink Shared Channel), being a shared transport channel, and an FACH (Forward Link Access Channel), being an example of a common transport channel, from Node B to a user equipment, UE. Within UMTS the interface between Node B and UE is called Uu.

3$^{rd}$ Generation Partnership Project (3GPP): Technical Specification Group Radio Access Network, RLC Protocol Specification, 3G TS 25.322 v3.5.0, France, December 2000, specifies the RLC protocol. The RLC layer provides three services to the higher layers:

transparent data transfer service,
unacknowledged data transfer service, and
acknowledged data transfer service.

In subsection 4.2.1.3 an acknowledged mode entity, AM-entity, is described (see FIG. 4.4 of the 3GPP Technical Specification). In acknowledged mode automatic repeat request, ARQ, is used. The RLC sub-layer provides ARQ functionality closely coupled with the radio transmission technique used.

Higher layer applications can be, e.g., applications on the Internet. Most applications on the Internet use protocols, such as TCP (Transport Control Protocol), that controls the transmission rate, based on link quality in terms of packet loss and delay characteristics. Consequently, besides the negative effect of retransmission delays as such on perceived quality, substantial queuing delay can also lead to secondary effects further reducing quality of service.

None of the cited documents above discloses a method and system of eliminating or reducing retransmissions due to route switching data losses, or flow control for route switching eliminating or reducing buffering, particularly inside of an ARQ loop.

SUMMARY OF THE INVENTION

Cited prior art references describe flow-control within packet data networks or retransmissions between a UE and an RNC.

In a system according to prior art, buffering of data causes round-trip time latency. I.e. the time for a user or user application to perceive a response to transmitted data or undertaken action from the receiving end is not immediate. Further buffering causes delay of (one-way) data destined for a user equipment.

For high-speed data transmissions over a shared channel according to the invention, additional multiple retransmission loops can be used to reduce loop-delay due to smaller round-trip delays of inner loops. Introduced buffering for such multiple (or inner) retransmission loops enhances the importance of this invention.

Further, when switching data packets into a new route, such as at channel type switching, handover or radio cell update, collectively referred to as route switching, there is a risk of loosing data transmitted to buffers of the old route. Such route switching is frequent particularly in high-speed mobile communications network, where the user equipment is moved between radio cells during transmission. One solution could be to transfer all data related to a connection from the buffers of the old route to buffers of the new route. However, this would require processing and signaling introducing additional time delay. A preferred solution according to the invention is to distribute a balanced amount of data to the various buffers such that upon route switching the data of the old buffers can be discarded, and to recover data by an existing retransmission protocol, retransmitting the data to buffers of a new route, resulting in a need to retransmit only small amounts of data due to route switching. Thereby, system load, delay and latency will not increase severely. This can be achieved by distributing a thoroughly determined amount of data to the buffers, in accordance with the invention.

Consequently, it is an object of this invention to eliminate or reduce delay and latency in a communications network using ARQ for error-prone transmission channels, such as a radio channel in a wireless communications network using high-speed downlink packet access.

It is also an object of this invention to eliminate or reduce delay and latency in a communications network using multiple or nested retransmission loops.

A related object is to reduce delay and latency volatility or variance.

A further object is to reduce or eliminate packet and data losses and the impact of retransmissions due to such losses on system load.

It is also an object to predict a sender need for future channel data rate.

Finally, it is an object to provide a method and apparatus for efficient route switching, particularly in a system using ARQ.

These objects are met by the invention, which is particularly well suited for a high-speed downlink packet access channel of an evolved universal mobile telecommunications system.

Preferred embodiments of the invention, by way of examples, are described with reference to the accompanying drawings below.

BRIEF DESCRIPTION OF THE DRAWINGS

FIG. 11 shows two alternative routes from a sending end according to the first embodiment of the invention, the respective routes comprising different receiving ends and loops comprising flow control for route switching according to the invention.

FIG. 12 shows two alternative routes from a sending end according to the second embodiment of the invention, the respective routes comprising different receiving ends and loops comprising flow control for route switching according to the invention.

DESCRIPTION OF PREFERRED EMBODIMENTS

Figure 1:
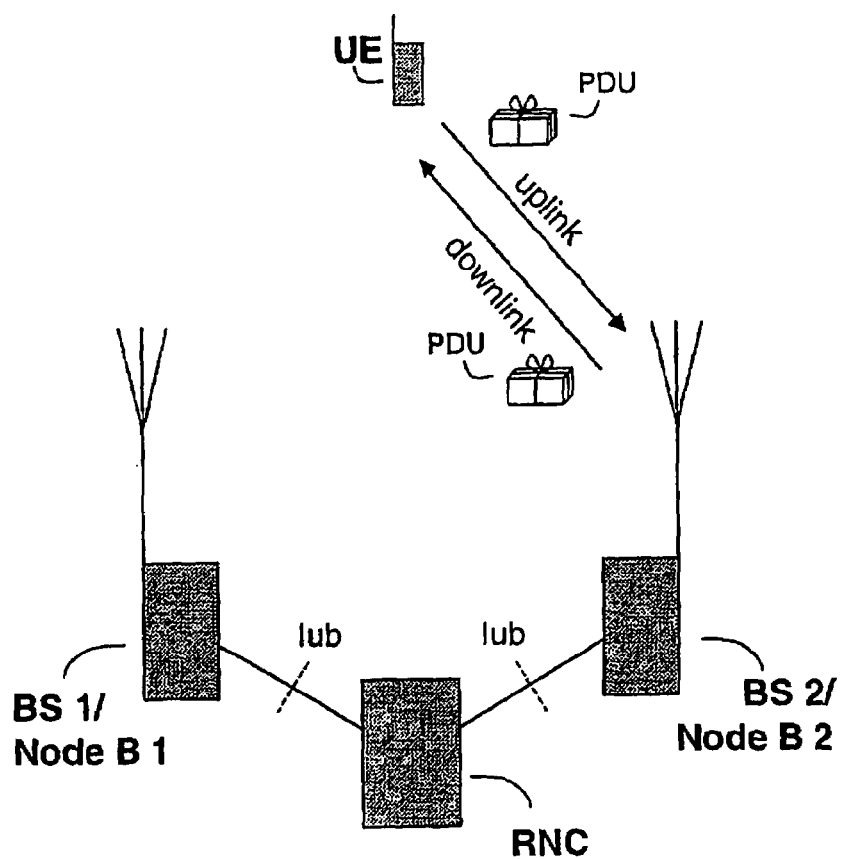
FIG. 1 shows communication, according to the invention, between a UE and a base station involved in a connection between an RNC and the UE.

As a user moves with his user equipment away from a base station >>BS 1<< towards another base station >>BS 2<< in FIG. 1, the connection between UE and RNC is likely to be rerouted from being over a first Node B >>Node B 1<< to being over a second Node B >>Node B 2<< or over both >>Node B 1<< and >>Node B 2<< using soft handover. In FIG. 1, the base stations are connected to the same radio network controller RNC. However, the invention also covers the exemplary situation where the base stations are connected to different RNCs. Depending on to which RNC the various Nodes B are associated, a need for change of Controlling RNC can arise as the user moves.

In an evolved WCDMA system, a high-speed downlink packet access channel, HSDPA channel, is a channel with similarities to a DSCH. However, it is based on a novel transport channel type. In the sequel, this is referred to as a High-Speed Downlink Shared CHannel, HS-DSCH. An HS-DSCH supports many new features not supported by DSCH, but also inherits some of the characteristics of a DSCH. There are several important features of an HS-DSCH. A sample of features is:

High data rates with peak data rates up to tens of Mbit/s.
Data is transmitted to multiple users on a shared channel by means of time-division multiplex, TDM, or code-division multiplex, CDM.
Higher-order modulation.
Modulation adaptive to radio channel conditions.
Fast retransmission with soft combining of re-transmitted data at UE, also referred to as Fast Hybrid ARQ or Fast HARQ.
Low air-interface delay, with maximum round-trip delay down to some ten milliseconds.

It is preferred that the Fast Hybrid ARQ over the air interface is terminated in Node B. This will require some buffering in Node B.

One reason for terminating the Fast Hybrid ARQ in Node B, as opposed to e.g. RNC, is the reduction of roundtrip delay as compared to terminating it in RNC. Another reason is that Node B is capable of using soft combining of multiply transmitted data packets, whereas RNC generally only receives hard-quantized bits. However, the termination of the Fast Hybrid ARQ in Node B brings forward further focus on and need for efficient flow control for route switching and related problems, solved by this invention.

Figure 4:
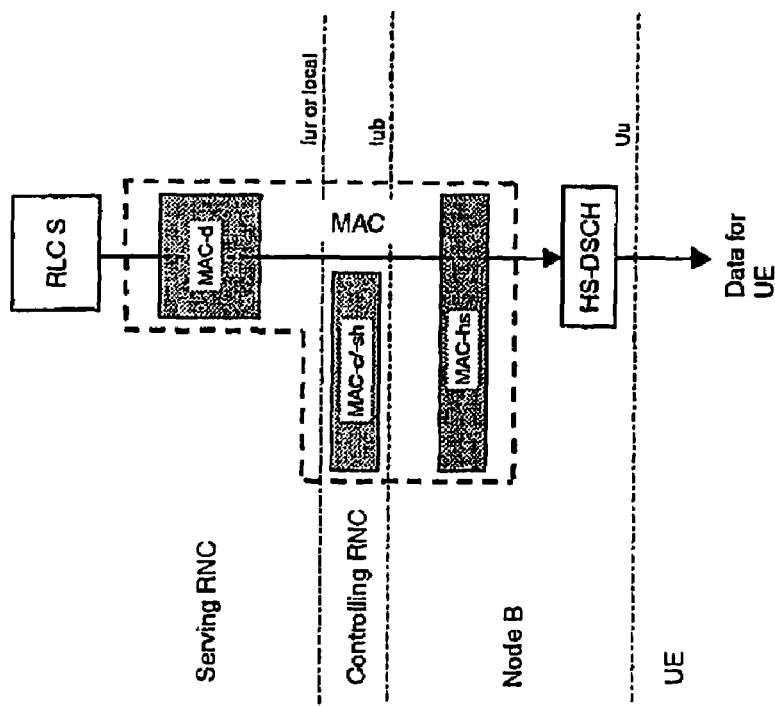
FIG. 4 shows a simplified protocol model for a high-speed downlink packet access channel according to the invention.

FIG. 4 shows a simplified protocol model for a high-speed downlink packet access, HSDPA, channel according to the invention. MAC-hs is the MAC entity responsible for HSDPA communications over a high-speed DSCH transport channel >>HS-DSCH<<. Preferably the entity is located in Node B. It comprises means for flow control between MAC-d and MAC-hs and preferably also means for hybrid ARQ over the radio interface. MAC-d comprises corresponding flow control means for communication with MAC-hs. As already mentioned, the MAC-entities >>MAC-d<< and >>MAC-hs<< preferably reside in different network elements. According to UMTS specifications, the MAC-d entity resides in Serving RNC.

Figure 2:
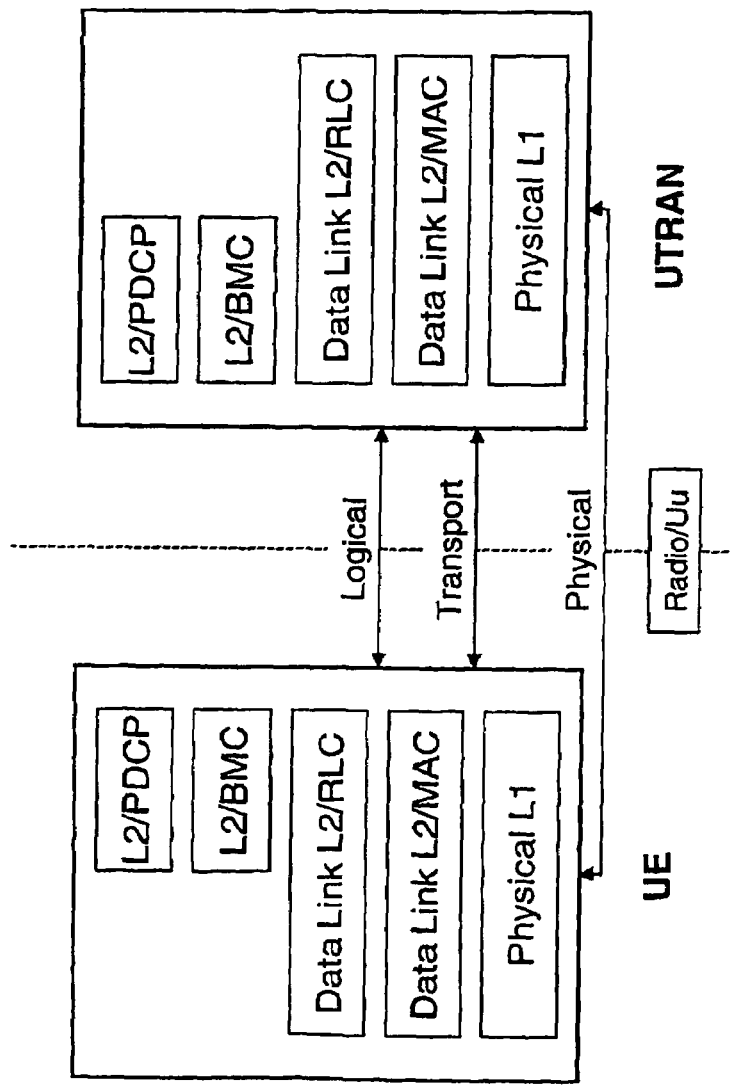
FIG. 2 displays a layered protocol structure, according to prior art, in a radio communications system.
Figure 5:
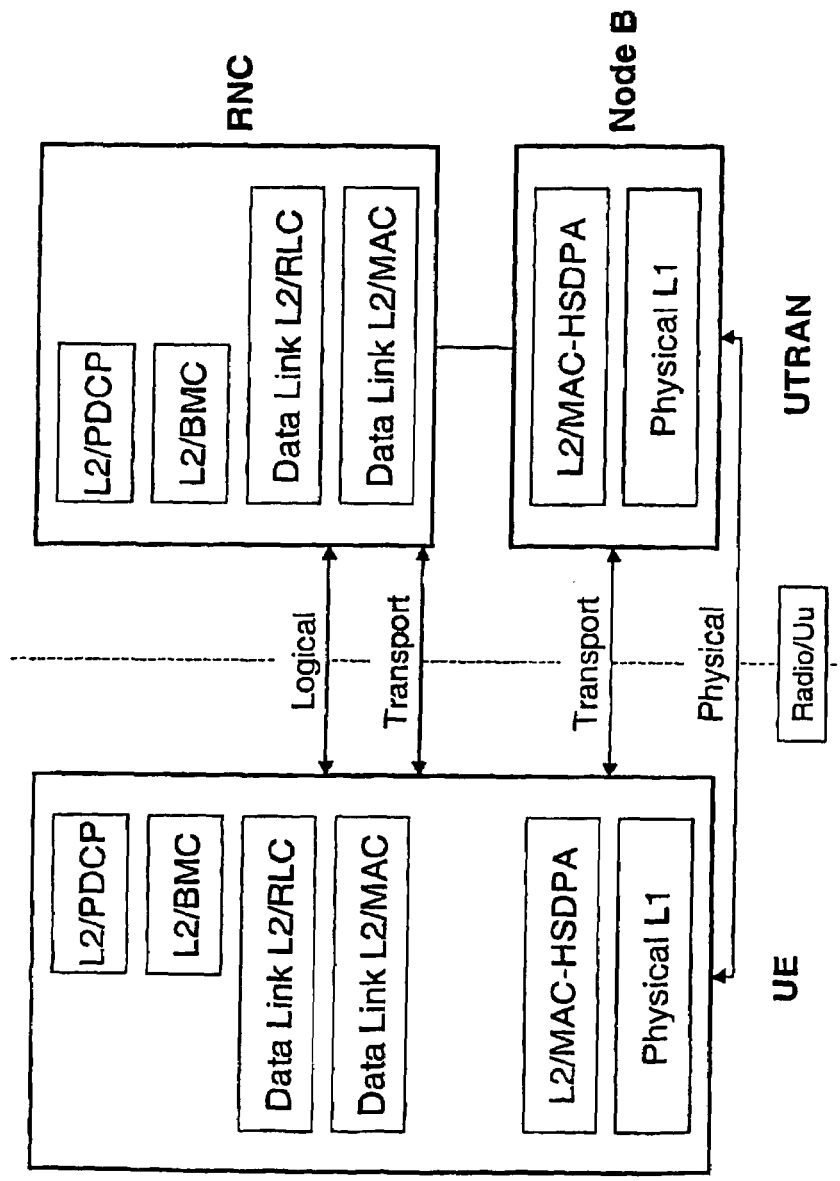
FIG. 5 displays a layered protocol structure, according to the invention, in a radio communication system.
Figure 6:
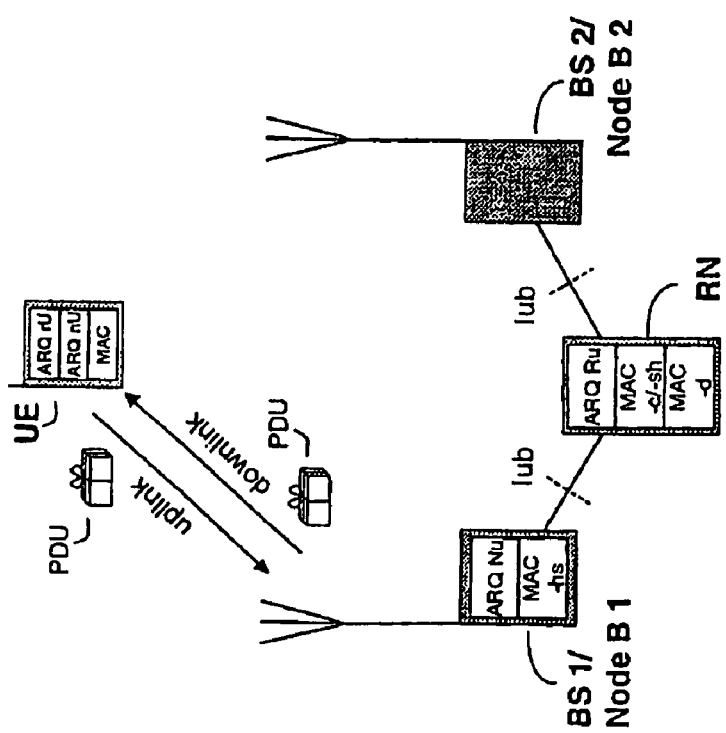
FIG. 6 illustrates a radio communications system using ARQ over the radio interface terminated in Node B and flow control for route switching according to the invention.

FIG. 5 shows a preferred layered protocol structure, a protocol stack, including an L2/MAC-HSDPA protocol layer. The L2/MAC layer of FIG. 2 has been extended and divided into two sub-layers, an L2/MAC sub-layer and a MAC-HSDPA sub-layer. Essentially the L2/MAC sub-layer corresponds to the prior art L2/MAC sub-layer of FIG. 2. The MAC-HSDPA plus the MAC layer could be regarded as one single MAC layer extended to also include ARQ functionality. However, for reasons of explanation they are preferably regarded as separate sub-layers. Further, on the network side, considering them as separate protocol sub-layers physically better corresponds to the physical entities where they reside. The inclusion of ARQ functionality, preferably hybrid ARQ functionality, introduces additional buffering in Node B 1, see FIGS. 4 and 6. Data packets not yet acknowledged are stored in Node B 1 and data packets in error are stored in UE to be combined with retransmissions. I.e., in addition to the sender-receiver relationship, described in relation to FIG. 3 and explained further in relation to FIG. 7, between the MAC-layers in RNC, there is a corresponding sender-receiver relationship between RNC and Node B MAC layers, and between Node B 1 and UE ARQ buffers >>ARQ Nu<<, >>ARQ nU<<, the cascading further comprised by an ARQ sender-receiver relationship between RNC and UE >>ARQ Ru<<, >>ARQ rU<<. As illustrated in FIGS. 5 and 6, on the UTRAN-side (or network side) L2/MAC sub-layer, >>L2/MAC<<, >>MAC-d<<, >>MAC-c/-sh<< is preferably located in >>RNC<<, whereas L2/MAC-HSDPA sub-layer >>L2/MAC-HS-DPA<<, >>MAC-hs<< is located in Node B, >>Node B<<, >>Node B 1<<. In FIG. 6, the RNC is illustrated for co-incident Serving RNC and Controlling RNC. This does not exclude separate Serving and Controlling RNCs, which will be further explained in relation to FIG. 7. With reference to FIG. 6, the L2/MAC-HSDPA sub-layer >>MAC-hs<<, >>MAC<< and the ARQ protocol >>ARQ Nu<<, >>ARQ nU<< can be co-incident or separate. As the hybrid ARQ protocol combines successively received retransmissions it is a great advantage to have this protocol close to the physical layer and, particularly, terminated in Node B >>Node B 1<<. Among the advantages achieved thereby, e.g., the round-trip delay is reduced as compared to a location in RNC. Within this patent application the protocol layers, except for L2/MAC and L2/MAC-HSDPA as just explained, correspond to those of FIG. 2.

Figure 7:
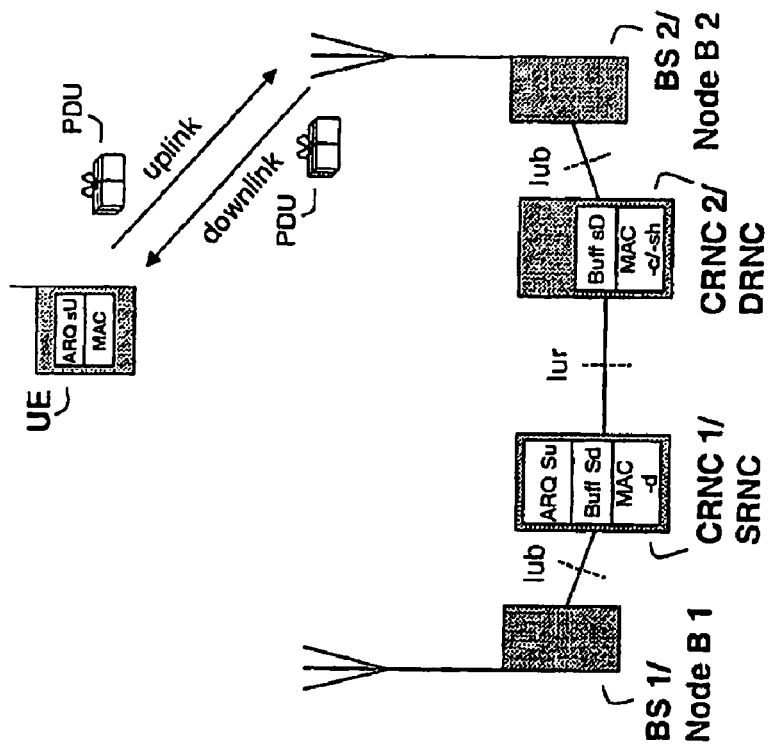
FIG. 7 illustrates a radio communications system using ARQ over the radio interface terminated in RNC and flow control for route switching according to the invention.

FIG. 7 illustrates a communications system with ARQ functionality located to RNC. The figure represents alternatives for the MAC-protocol in RNC. The MAC protocol can also include a MAC-hs protocol as described in relation to FIG. 6, not indicated in FIG. 7 to simplify reading. However, location of MAC-hs to Node B is preferred. FIG. 7, e.g., represents a realization of the protocol model of FIG. 3. >>SRNC<< interconnects UE to a Core Network, not illustrated. >>UE<< is connected to >>SRNC<< over >>Node B 2<< and >>CRNC 2/DRNC<<. According to FIG. 7 >>SRNC<< is not controlling the Node B>>Node B 2<<. (For illustration, >>SRNC<< controls >>Node B 1<<.) >>Node B 2<< is controlled by Controlling RNC >>CRNC 2<<, acting as a Drift RNC >>DRNC<< in this examplary illustration. The Drift RNC supports the Serving RNC when a UE needs to use cells/Nodes B controlled by an RNC different from the SRNC. The RNCs are interconnected over an Iur interface. As explained above in relation to FIG. 3, routing of dedicated channels over common or shared channels comprises buffering of data between Serving RNC and Controlling RNC. In FIG. 7, the buffering occurs in buffers >>Buffer Sd<< and >>Buffer sD<< for the sender-receiver relationship between SRNC and DRNC. The latency of the loop involving the buffers >>Buffer Sd<< and >>Buffer sD<< will be substantial if the distance between Serving RNC and Controlling RNC is large. In FIG. 7, there is further buffering >>ARQ Su<< in >>SRNC<< associated with the ARQ-protocol in the sender-receiver relationship between >>SRNC<< and >>UE<<. >>UE<< includes corresponding ARQ buffering >>ARQ Su<<.

FIG. 7 alone illustrates nested sender-receiver relationships by means of buffers >>ARQ Su<</>>ARQ sU<< and buffers >>Buffer Sd<</>>Buffer sD<<. The buffers >>ARQ Nu<<, >>ARQ nU<< described in relation to FIG. 6 further increases the number of buffers when added to those of FIG. 7 and illustrates the importance of efficient flow control for route switching and need for a system that need not keep track of and forward individual data packets of each buffer at route switching.

When cascading multiple retransmission loops, buffering of inner loops affects round-trip time of outer loops. Retransmission times generally need to be set to higher values to avoid unnecessary retransmissions and will eventually lead to greater round-trip times. Greater round-trip times of outer loops increases the latency of the communications link and decreases link performance, since lost packets will not be retransmitted until the round-trip time has passed. If round-trip time of an inner retransmission loop varies substantially, it further introduces difficulties to determine appropriate timer-settings of outer loops, that should not time out before the round-trip time has passed and selection of appropriate quality level of delay sensitive protocols such as streaming protocols. Generally, the retransmission timer should be set to the largest round-trip time. Particularly, for efficient RLC protocol operation accurate prediction of the round-trip time is important.

When switching data packets into a new route, such as at channel type switching, handover or radio cell update collectively referred to as route switching within this patent application, there is a risk of loosing data transmitted to buffers of the old route. Such route switching is frequent particularly in high-speed mobile communications network, where the user equipment is moved between radio cells during data transmission/reception. One solution could be to transfer all data related to a connection from the buffers of the old route to buffers of the new route. However, this would require processing and signaling, introducing additional time delay. A preferred solution according to the invention is to distribute a balanced amount of data to the various buffers such that upon route switching the data of the old buffers can be discarded, and to recover data by an existing retransmission protocol, retransmitting the data into buffers of the new route, resulting in a need to retransmit only small amounts of data due to route switching. Thereby, system load, delay and latency will not increase severely. This can be achieved by distributing a thoroughly determined amount of data to the buffers, in accordance with the invention.

Figure 8:
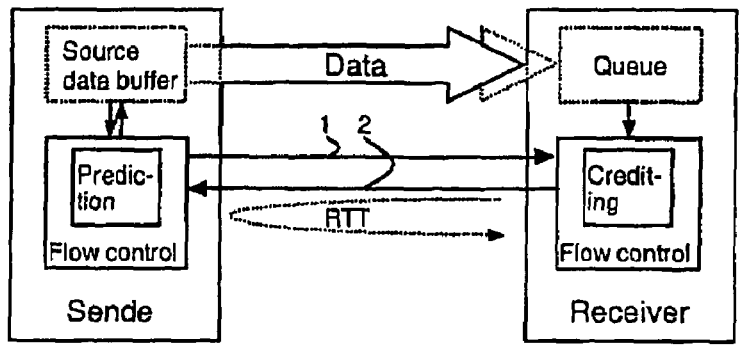
FIG. 8 shows a first embodiment of a sending end and a receiving end of a loop comprising flow control for route switching according to the invention.
Figure 9:
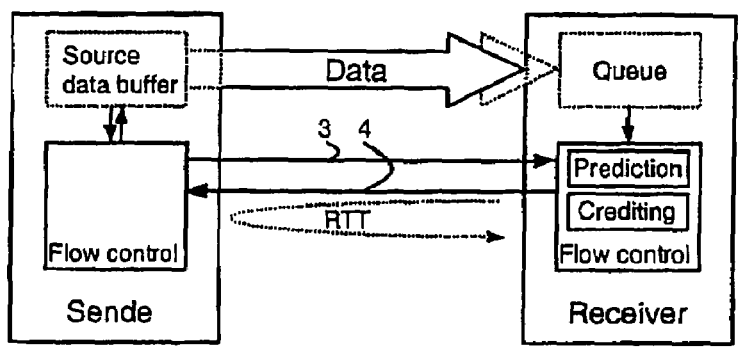
FIG. 9 shows a second embodiment of a sending end and a receiving end of a loop comprising flow control for route switching according to the invention.
Figure 10:
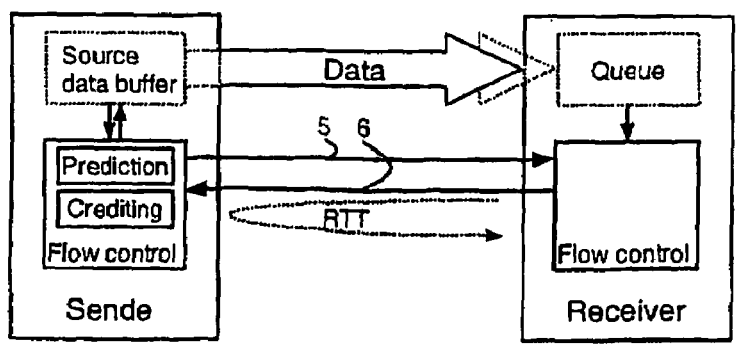
FIG. 10 shows a third embodiment of a sending end and a receiving end of a loop comprising flow control for route switching according to the invention.

FIGS. 8, 9 and 10 show a sending end and a receiving end of a loop comprising flow control for route switching according to the invention. The respective sending and receiving ends comprise a sending buffer >>Source data buffer<< and a receiving buffer >>Queue<<. The receiving buffer can correspond to a channel or a channel type within a radio communications system. Between the sender and receiver there is a round-trip time delay, RTT. Consequently, if a control message 2, 4, 6 is transmitted from the receiver to the sender, a response to the control message from the sender cannot reach the receiver until a time of RTT has passed. Preferred embodiments of the sender and receiver entities according to the invention include prediction and flow control elements, which are best understood in connection with, but not limited to, an algorithm described in relation to FIG. 13.

Figure 3:
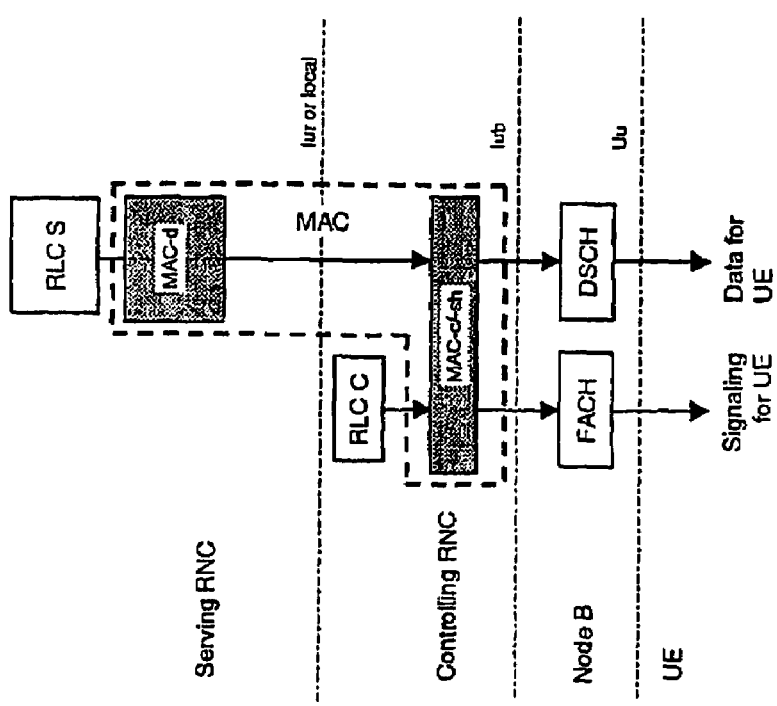
FIG. 3 illustrates a DSCH protocol model, according to prior art, in a WCDMA system.

In relation to FIG. 3, the sending and receiving buffers of FIGS. 8, 9 and 10 can be MAC-d and MAC-c/-sh respectively. With reference to FIG. 4, the sending and receiving buffers can be MAC-d and MAC-hs respectively. The sender and receiver of FIGS. 8, 9 and 10 can also be corresponding protocol entities of e.g. an RNC and UE or a Node B and a UE. This invention applies to sender-receiver relationships involving buffers and flow control, irrespective of whether there are single or multiple loops, if loops are cascaded or if there are inner and outer loops.

FIGS. 11 and 12 each shows two alternative routes from a sending end >>Sender<<, the respective routes comprising different receiving ends >>Receiver A<<, >>Receiver B<< and loops comprising flow control for route switching for the embodiments of the invention as illustrated in FIGS. 8 and 9, respectively. The corresponding alternative routes for the embodiment shown in FIG. 10 is immediate, knowing FIGS. 8 and 9. Round-trip times >>RTT A<<, >>RTT B<< of the respective loops are not necessarily identical. If a connection at one moment is over Receiver A, data packets are transferred from a buffer >>Source data buffer<< of Sender to a buffer >>Queue A<< of Receiver A. Receiver A communicates control messages 2a, 4a to the sender. These control messages correspond to control messages 2 in FIGS. 8 and 4 in FIG. 9 respectively. If, e.g., Receiver A is an entity of BS 1/Node B 1 of FIG. 6, Receiver B is an entity of BS 2/Node B 2 and Sender is an entity of RNC of FIG. 6, a change of route connecting UE and RNC from being over Receiver A to being over Receiver B at handover from Node B 1 to Node B 2 will result in the route RNC-Node B 2-UE. This route is the one illustrated in FIG. 1. As previously described, there could also be a number of other situations leading to a route switch, switching from a route involving one receiver/channel >>Receiver A<< to a route involving another receiver/channel >>Receiver B<<. According to the invention there is no need to keep track of and forward the user content of buffer >>Queue A<< to the buffer >>Queue B<<, when a route is switched from Receiver A to Receiver B. It will be retransmitted by Sender. The increase in system load and latency could be substantial if there were a large amount of data related to a user, for which a route is switched, if this data was discarded and would be needed to transmit anew from >>Sender<<, but now to >>Receiver B<<, particularly if such route switches are frequent, which e.g. is the case for users moving swiftly in relation to cell size. As nonexclusive examples, cellular systems for high data rates are likely to use small cell sizes, as are cellular systems in crowded areas. It will be described in further detail in relation to FIG. 13, how system load and latency can be kept at a minimum using appropriate flow control. FIG. 11 will be described in further detail in relation to FIG. 13 below.

Figure 13:
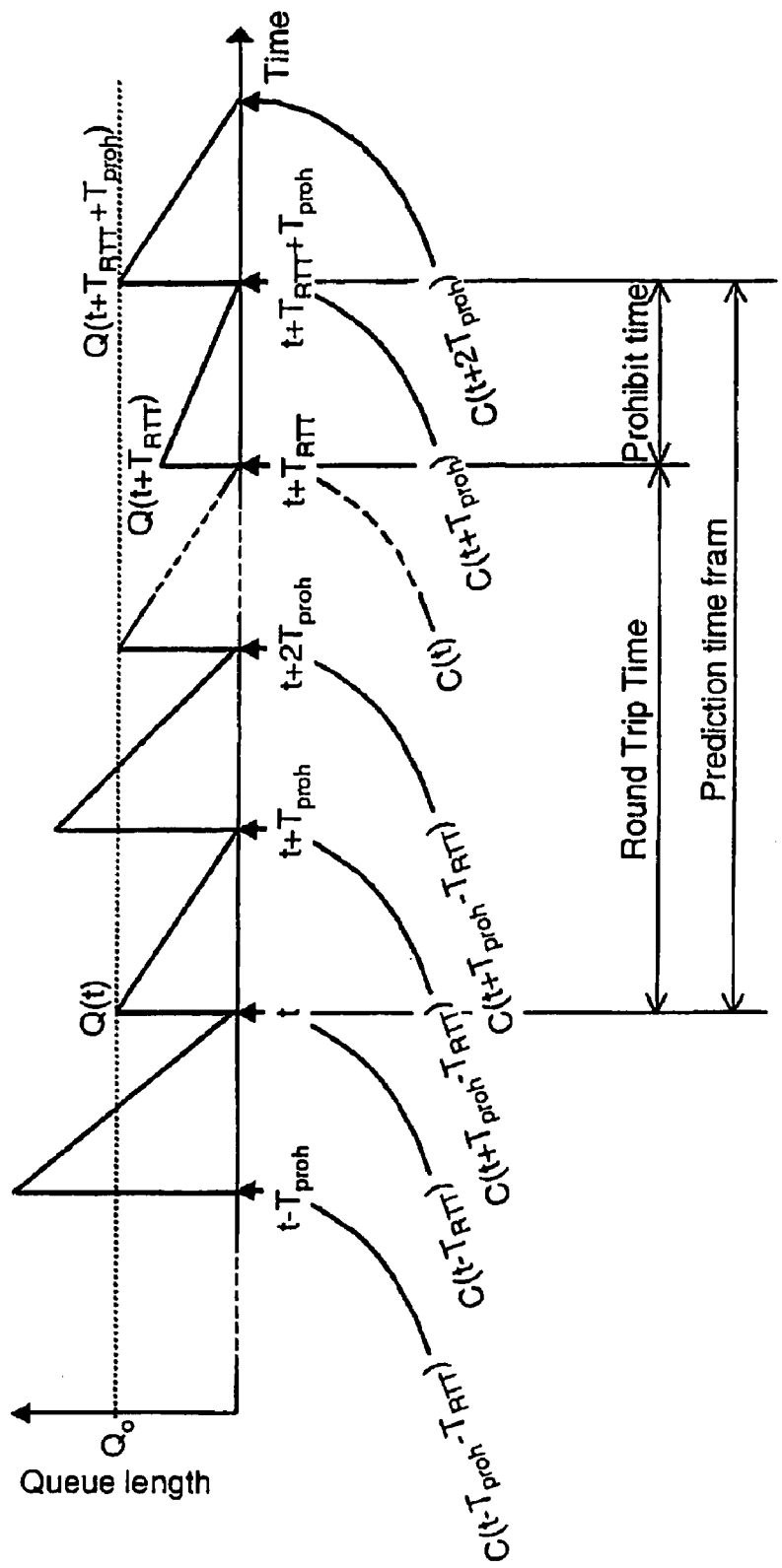
FIG. 13 illustrates predictive flow control according to the invention.

FIG. 13 illustrates a predictive flow control for route switching versus time to keep queues at an appropriate level, according to the invention. Credits, C(t), for a particular channel or receiving buffer are calculated from predictions of traffic, existing amount of queued data in channel/receiving buffer and credits outstanding according to $$C(t) = \begin{cases} C^*(t), & \text{if } C^*(t) \leq \hat{C}(t) \\ \hat{C}(t), & \text{otherwise} \end{cases}$$

where $$\hat{C}(t) = N_{pred}(t + T_{RTT}, t + T_{RTT} + T_{proh}),$$

$$C^*(t) = N_{pred}(t, t + T_{RTT} + T_{proh}) - Q(t) - \sum_{n \in \{n \geq 0; nT_{proh} \leq T_{RTT}\}} C(t - (n+1)T_{proh}).$$

$N_{pred}(t, t+T_{RTT}+T_{proh})$ is the at time t predicted number of packets that will be sent further during the next time period of $T_{RTT}+T_{proh}$, i.e. the predicted number of packets that will be transmitted on the channel/to the buffer during prediction time interval $[t, t+T_{RTT}+T_{proh}]$. Correspondingly, $N_{pred}(t+T_{RTT}, t+T_{RTT}+T_{proh})$ is the at time t predicted number of packets that will be transmitted on the channel/to the buffer during prediction time interval $[t+T_{RTT}, t+T_{RTT}+T_{proh}]$. Q(t) is the queue length in receiving buffer at time t and $\sum_{n \in \{n \geq 0: nT_{proh} \leq T_{RTT}\}} C(t-(n+1)T_{proh})$ is the sum of all credits given during time interval $[t-T_{RTT}, t]$, i.e. during a time period of $T_{RTT}$ preceding the point in time for prediction.

In FIG. 13, a flow control prohibit time $T_{proh}$ determines the time instances of transmission of control messages. When a control message with credits has been transmitted from the receiver/channel to the source/sender, no new control message with new credits for the same source/sender will be transmitted until the prohibit time has elapsed. In FIG. 13, the present time instance for transmission of a control message is time t. An earlier time instance $t-T_{proh}$ and future time instances for transmission of control messages $t+T_{proh}$, $t+2T_{proh}$, . . . are also indicated. Communications between the receiver buffer and source/sender buffer is subject to a round-trip time, $T_{RTT}$, corresponding to propagation time delay, back and forth, and processing time. The prohibit time, $T_{proh}$, is preferably selected, such that the round-trip time, $T_{RTT}$ is an integer multiple thereof, i.e. $T_{RTT}=nT_{proh}$, e.g. $T_{RTT}=3T_{proh}$. The shorter the prohibit time selected (and the greater the integer, for a fixed round-trip time) the shorter the queue length at the receiving end. Consequently, the prediction time interval comprises the round-trip time, $T_{RTT}$, and the prohibit time, $T_{proh}$. At time t, this prediction interval is $[t, t+T_{RTT}+T_{proh}]$. Given a number of queued data packets of Q(t) at time t at the receiving end, this number of data packets remains to be processed and reduces the credit to give. Including the predicted number of data packets, requested for further transmission, and the number of credits outstanding will end up in a predicted number of data packets to receive/transmit on the channel during the prediction interval. This predicted number of data packets will form a credit C(t) representing an appropriate number of data packets for transmission from the sending buffer to the receiving buffer during the next prohibit time interval, $T_{proh}$, not building up unnecessarily large queues in the receiving buffer. The prediction time frame slides as time passes so that the prediction time frame, as illustrated in FIG. 13, always starts at present time.

As seen in FIG. 13, credits outstanding will be consumed/responded to from the sender/source within the pre-diction time frame and reduce the credit that can be given at time t. For a fully utilized network, credits are preferably given such that the maximum queue length in the receiving buffer is close to an optimal level, $Q_o$, at the beginning of the prohibit time intervals, or at a level close to zero at the end of the prohibit time interval. If the level is set too low, the network will be underutilized and transmission resources will be left unused. If the queue level is set too large, unnecessarily large amounts of data will need to be retransmitted from the sender to the new receiver at a route switch and will increase round-trip time excessively, as explained above. Limiting credits to $\hat{C}(t)$ will guarantee that credits not larger than the predicted amount of data for the prohibit time interval will be given. Though preferable, this limiting and its associated prediction are optional.

Keeping the maximum queue size close to an optimal level, $Q_o$, preferably being constant or only slowly varying, reduces the variability of round-trip time of outer retransmission loops and enables accurate prediction of the round-trip time. Particularly, retransmission timers of outer loops can be set to smaller values thereby improving system performance.

If a sending queue, such as >>Source data buffer<< in FIGS. 8-12, has a large amount of packets/data, prediction of channel resources required for transmission can generally be estimated accurately for a sufficiently long time interval, also reflecting different priorities for different sources when prioritized transmission is used. Predictions formed from less information are subject to greater prediction errors. In those cases, predictions can be supported by historical mean rates. Further, if there is no history to take advantage of, e.g. at startup, estimation can be based on default values, guaranteed rate or maximum rate. Predictions can be performed in the sender end, the receiver end or both. The predicted number of packets that will be sent further during the next prediction time interval of $T_{RTT}+T_{proh}$ can be separated into two components representing a round-trip time interval, $T_{RTT}$, and an additional prohibit time interval, $T_{proh}$, respectively $$N_{pred}(t,t+T_{RTT}+T_{proh})=N_{pred}(t,t+T_{RTT})+N_{pred}(t+T_{RTT}, t+T_{RTT}+T_{proh}).$$

The time intervals are illustrated in FIG. 13.

In FIGS. 8-12, information for predictions is transferred from Source data buffer to a Prediction entity >>Prediction<< for data flow control. According to a first embodiment, illustrated in FIGS. 8 and 11, the prediction is performed in a flow control entity >>Flow control<< at the sending end >>Sender<< and a predicted number of packets $N_{pred}$ is transferred, 1, 1a, 1b, from the prediction entity >>Prediction<< of Sender to the receiving entity >>Receiver<<, >>Receiver A<<, >>Receiver B<< for determination of credits in processing means >>Crediting<< of the respective receiver entities, to be transferred back, 2, 2a, 2b to the sending entity >>Sender<<. According to an alternative embodiment, as shown in FIGS. 9 and 12, relevant sender parameters upon which the prediction is based are transferred 3, 3a, 3b to the receiving entity, >>Receiver, for prediction of the number of packets, $N_{pred}$, that will be transmitted on the channel/to the buffer during the prediction time interval. In a third alternative embodiment shown in FIG. 9, data is transferred from the receiver to the sender 5 upon request from the sender, 6 for determining credits at the sender, reciprocally to FIG. 9. Generally, less data needs to be transferred if credits are determined at the receiving end. This can be circumvented by calculating and transferring one or more parameters representing a plurality of parameters, such as the sum of Q(t) and $\Sigma_{n\in\{n\geq 0:nT_{proh}\leq T_{RTT}\}}C(t-(n+1)T_{proh})$. Credits are determined on basis of the receiver queue length, Q, the predicted number of packets that will be transmitted during the prediction time interval, $N_{pred}$, and credits outstanding, $\Sigma_{n\in\{n\geq 0:nT_{proh}\leq T_{RTT}\}}C(t-(n+1)T_{proh})$. The credits are determined in a crediting entity >>Crediting<< of FIGS. 8-12. For embodiments with this entity located to the receiving end, the credits are transferred 2, 2a, 2b, 4, 4a, 4b to the sending end and stored for a time corresponding to the pre-diction time frame in the receiving end, >>Receiver<<, >>Receiver A<<, >>Receiver B<<, for later crediting. The Source data buffer receives signals from the flow control entity >>Flow control<< of the Sender indicating amount of data >>Data<<, >>Data A<<, >>Data B<< to transfer to the receiving end, >>Receiver<<, >>Receiver A<<, >>Receiver B<<.

If there are sources of different priority at the sending end, credit calculations are based on the entire queue length at the receiving end. If there are, e.g., receiving end channels of different priorities, there will be different queues, and queue lengths considered, calculating credits for the respective channel priority classes.

Preferably, all retransmission entities of the radio communications system operate according to the invention for outstanding performance. However, the invention can also be used in systems also including retransmission entities not operating according to the invention.

A person skilled in the art readily understands that the receiver and transmitter properties of a BS or a UE are general in nature. The use of concepts such as BS, UE or RNC within this patent application is not intended to limit the invention only to devices associated with acronyms used in this specification. The invention concerns all devices operating correspondingly, or being obvious to adapt thereto by a person skilled in the art, in relation to the invention. As an explicit non-exclusive example the invention relates to mobile stations without a subscriber identity module, SIM, as well as user equipment including one or more SIMs. Further, protocols and layers are referred to in close relation with UMTS terminology. However, this does not exclude applicability of the invention in other systems with other protocols and layers of similar functionality.

The invention is not intended to be limited only to the embodiments described in detail above. Changes and modifications may be made without departing from the invention. It covers all modifications within the scope of the following claims.

The invention claimed is:

1. A method of minimizing retransmission of data packets in a wireless communications system, said method comprising the step of:
    using a flow control process for route switching, wherein said flow control process comprises signals carrying information on i) predicted amount of data to send or ii) information for estimation of amount of data to send, said signals being transmitted to a data receiver, wherein credits for the flow control for route switching are determined based upon at least one parameter selected from the group consisting of:
    credits outstanding;
    queue length;
    queue priority; and
    estimated amount of data to send within a predetermined time frame;
    wherein said credits are determined such that, for a given prediction time interval and a given prohibit time interval, the queue length at the beginning of the last prohibit time interval of the predetermined prediction time interval is close to a value being fixed for a given duration of the prohibit time interval.

2. The method recited in claim 1, wherein the amount of data to send within the pre-determined time-frame is estimated as a function of at least one parameter selected from the group consisting of:
    historical data rate;
    historical mean data rate;
    maximum data rate of a scheduled channel;
    guaranteed data rate; and
    default data rate.

3. The method recited in claim 1, wherein said credits are determined such that, for a specified time frame, the queue length is minimized at the end of said time frame.

4. The method recited in claim 1, wherein credits are limited to an estimated amount of data to send within a time frame comprising a prohibit time interval, starting at a time ahead corresponding to at least a round-trip time of a sender-receiver relationship.

5. The method recited in claim 1, wherein when route switching from an old route to a new route, user data in a queue of the old route is discarded and retransmitted over the new route.

6. The method recited in claim 1, wherein the route includes a protocol entity selected from the group consisting of:
 a MAC protocol layer;
 a MAC-d protocol layer;
 a MAC-c/-sh protocol layer;
 a MAC-hs protocol layer; and
 a hybrid ARQ protocol.

7. The method recited in claim 1, wherein the route includes a radio network controller of a radio communications system.

8. The method recited in claim 1, wherein the route includes a Node B or a base station of a radio communications system.

9. The method recited in claim 1, wherein the route switching process is selected from the group consisting of:
 channel switching;
 channel type switching;
 handover; and
 radio cell update.

10. The method recited in claim 1, wherein said method of minimizing retransmission comprises one or more outer retransmission loops.

11. The method recited in claim 10, wherein credits are determined to minimize round trip variability of said one or more outer retransmission loops.

12. The method recited in claim 1, wherein said method of minimizing retransmission comprises one or more inner retransmission loops.

13. The method recited in claim 1, wherein said method of minimizing retransmission comprises two or more cascaded retransmission loops.

14. A network element in a wireless communications system for minimizing retransmission of data packets, said network element comprising:
 means for using a flow control process for route switching, wherein said flow control process comprises signals carrying information on i) predicted amount of data to send or ii) information for estimation of amount of data to send, said signals being transmitted to a data receiver, wherein credits for the flow control for route switching are determined based upon at least one parameter selected from the group consisting of:
 credits outstanding;
 queue length;
 queue priority;
 estimated amount of data to send within a predetermined time frame;
 historical data rate;
 historical mean data rate;
 maximum data rate of a scheduled channel;
 guaranteed data rate; and
 default data rate; and
 processing means for determining credits such that, for a given time-frame, queue length at the end of the time-frame is minimized;
 wherein the processing means for determining credits determines credits such that, for a given prediction time-frame and a given prohibit time interval, queue length at the beginning of the last prohibit time interval of the predetermined prediction time-frame is close to a value being fixed for a given duration of the prohibit time interval.

15. The network element recited in claim 14, wherein the processing means for determining credits determines credits such that they are limited to an estimated amount of data to send within a time frame comprising a prohibit time interval, starting at a time ahead corresponding to at least a round-trip time of a sender-receiver relationship.

16. The network element recited in claim 14, wherein when route switching from an old route to a new route, user data in a queue of the old route is discarded and retransmitted over the new route.

17. The network element recited in claim 14, wherein the route includes a protocol entity selected from the group consisting of:
 a MAC protocol layer;
 a MAC-d protocol layer;
 a MAC-c/-sh protocol layer;
 a MAC-hs protocol layer; and
 a hybrid ARQ protocol.

18. The network element recited in claim 14, wherein the route includes a radio network controller of a radio communications system.

19. The network element recited in claim 14, wherein the route includes a Node B or a base station of a radio communications system.

20. The network element recited in claim 14, wherein the route switching process is selected from the group consisting of:
 channel switching;
 channel type switching;
 handover; and
 radio cell update.

21. The network element recited in claim 14 wherein said retransmission comprises one or more outer retransmission loops.

22. The method recited in claim 21, wherein credits are determined to minimize round trip variability of said one or more outer retransmission loops.

23. The network element recited in claim 14, wherein said retransmission comprises one or more inner retransmission loops.

24. The network element recited in claim 14, wherein said retransmission comprises two or more cascaded retransmission loops.

25. A method of minimizing retransmission of data packets in a wireless communications system, said method comprising the step of:
 using a flow control process for route switching, wherein said flow control process comprises signals carrying information on i) predicted amount of data to send or ii) information for estimation of amount of data to send, said signals being transmitted to a data receiver, wherein credits for the flow control for route switching are determined based upon at least one parameter selected from the group consisting of:
 credits outstanding;
 queue length;
 queue priority; and
 estimated amount of data to send within a predetermined time frame;
 wherein credits are limited to an estimated amount of data to send within a time frame comprising a prohibit time interval, starting at a time ahead corresponding to at least a round-trip time of a sender-receiver relationship.

26. A network element in a wireless communications system for minimizing retransmission of data packets, said network element comprising:
 means for using a flow control process for route switching, wherein said flow control process comprises signals carrying information on i) predicted amount of data to send or ii) information for estimation of amount of data to send, said signals being transmitted to a data receiver, wherein credits for the flow control for route switching are determined based upon at least one parameter selected from the group consisting of:

credits outstanding;
queue length;
queue priority;
estimated amount of data to send within a predetermined time frame;
historical data rate;
historical mean data rate;
maximum data rate of a scheduled channel;
guaranteed data rate; and
default data rate; and
processing means for determining credits such that, for a given time-frame, queue length at the end of the time-frame is minimized;
wherein the processing means for determining credits determines credits such that they are limited to an estimated amount of data to send within a time frame comprising a prohibit time interval, starting at a time ahead corresponding to at least a round-trip time of a sender-receiver relationship.

* * * * *